(12) United States Patent
Farrington (10) Patent No.: US 8,221,930 B2
(45) Date of Patent: Jul. 17, 2012

(54) BIPOLAR SEPARATORS WITH IMPROVED FLUID DISTRIBUTION

(75) Inventor: Simon Farrington, Vancouver (CA)

(73) Assignees: Daimler AG, Stuttgart (DE); Ford Motor Company, Dearborn, MI (US)

(*) Notice: Subject to any disclaimer, the term of this patent is extended or adjusted under 35 U.S.C. 154(b) by 1303 days.

(21) Appl. No.: 11/843,063

(22) Filed: Aug. 22, 2007

(65) Prior Publication Data

US 2008/0107952 A1 May 8, 2008

Related U.S. Application Data

(60) Provisional application No. 60/932,985, filed on Aug. 23, 2006.

(51) Int. Cl.
*H01M 8/04* (2006.01)

(52) U.S. Cl. .......................... 429/454; 429/457; 429/518

(58) Field of Classification Search .......... 429/454–459, 429/518
See application file for complete search history.

(56) References Cited

U.S. PATENT DOCUMENTS

| | | | |
|---|---|---|---|
| 6,066,409 A | 5/2000 | Ronne et al. | |
| 6,232,008 B1 | 5/2001 | Wozniczka et al. | |
| 6,524,735 B1 | 2/2003 | Wariishi et al. | |
| 6,607,858 B2 | 8/2003 | Wozniczka et al. | |
| 6,686,085 B1 | 2/2004 | Fujii et al. | |
| 6,764,783 B2 | 7/2004 | Ronne et al. | |
| 6,777,127 B2 | 8/2004 | Einhart et al. | |
| 6,878,477 B2 | 4/2005 | Frank et al. | |
| 6,921,599 B2 | 7/2005 | Biegert et al. | |
| 6,946,212 B2 | 9/2005 | Ronne et al. | |
| 2003/0143451 A1 | 7/2003 | Andou et al. | |
| 2004/0115512 A1 | 6/2004 | Fujii et al. | |
| 2004/0161653 A1 | 8/2004 | Andrews et al. | |
| 2004/0219410 A1* | 11/2004 | Tanaka et al. | 429/26 |
| 2005/0118486 A1 | 6/2005 | Strobel et al. | |
| 2005/0142414 A1 | 6/2005 | Kimura et al. | |
| 2005/0271910 A1 | 12/2005 | Bai et al. | |
| 2006/0003220 A1 | 1/2006 | Sugiura et al. | |
| 2006/0172177 A1 | 8/2006 | Scherer et al. | |

FOREIGN PATENT DOCUMENTS

| | | |
|---|---|---|
| EP | 1 441 403 A2 | 7/2004 |
| JP | 10074527 A | 3/1998 |
| JP | 11309746 A | 11/1999 |
| JP | 2000323149 A | 11/2000 |
| JP | 2002050368 A | 2/2002 |
| JP | 2004207074 A | 7/2004 |
| JP | 2004296138 A | 10/2004 |
| JP | 2005050584 A | 2/2005 |
| JP | 2005216869 A | 8/2005 |
| JP | 2006004702 A | 1/2006 |
| JP | 2006032008 A | 2/2006 |

\* cited by examiner

*Primary Examiner* — Thanhha Pham
(74) *Attorney, Agent, or Firm* — Patent Central LLC; Stephan A. Pendorf (57) ABSTRACT

A fuel cell separator having a first plate, the first plate including an active surface comprising a reactant flow field and a header fluidly connected thereto, an opposing non-active surface, and a header channel fluidly connected to the header, wherein the header further includes a recess directly fluidly connected to one end of the header channel, wherein the recess comprises a top perimeter and a side wall. In one embodiment, the header channel is formed on the active surface of the plate. In another embodiment, the header channel is formed on the non-active surface of the plate and the side wall of the header further comprises at least one fluid port fluidly connected to the end of the header channel.

20 Claims, 10 Drawing Sheets

BIPOLAR SEPARATORS WITH IMPROVED FLUID DISTRIBUTION

CROSS-REFERENCE TO RELATED APPLICATION

This application claims the benefit under 35 U.S.C. §119 (e) of U.S. Provisional Patent Application No. 60/932,985, filed Aug. 23, 2006 (formerly U.S. application Ser. No. 11/509,328, converted to provisional by Petition dated Aug. 20, 2007), which provisional application is incorporated herein by reference in its entirety.

BACKGROUND

1. Technical Field

The present invention relates to bipolar separators for fuel cells and, in particular, bipolar separators with improved flow properties.

2. Description of the Related Art

Electrochemical fuel cells convert reactants to generate electric power and reaction products. Electrochemical fuel cells generally employ an electrolyte interposed between two electrodes, namely a cathode and an anode, to form an electrode assembly, which is typically interposed between two electrically conductive flow field plates or separator plates (separators) made of carbonaceous, graphitic, and/or metallic materials. These separators act as current collectors, provide support for the electrodes, and provide passages for the reactants and products. Such separators may comprise channels to direct the flow of reactants to the anode and the cathode, and to remove excess reactants and their reaction products, such as water formed during fuel cell operation.

Fuel cells may employ bipolar separators having an anode flow field on one surface, and a cathode flow field on the opposing surface. Alternatively, a bipolar separator may be employed having an anode flow field plate with an anode flow field on its active surface, and a cathode flow field plate with a cathode flow field on its active surface, joined together around their peripheral edges to form a coolant flow field between their non-active surfaces. In such cases, the bipolar separator is sealed so the coolant does not leak from the fuel cell.

Typically, a number of fuel cells are electrically coupled in series to form a fuel cell stack. The fuel cell stack may contain supply and exhaust manifolds for directing the flow of reactants to/from the fuel cell stack. In some cases, the anode and cathode plates have header regions ("headers") between the manifold openings and the respective flow fields. The primary function of such headers is to evenly distribute flow to or from the manifold openings and the respective flow fields. This is accomplished by providing paths for the fluid to travel having various distances (as determined by the width of the flow field) with minimum differences in flow resistance between the various paths.

Existing header configurations generally cause unacceptably high gas velocities where the gas exits the manifold openings and enters the headers, which results in uneven flow (i.e., uneven "sharing") between the flow channels in the flow field. For example, the flow channels that are closer to the manifold opening will receive reactant at a higher pressure than the flow channels that are farther from the manifold opening, thus resulting in different channel-to-channel flow distributions. Furthermore, manufacturing defects may create slightly different flow channel geometries for each of the flow channels (e.g., different cross-sectional areas), resulting in different flow resistances and, thus, different channel-to-channel flow distributions.

As a result, there remains a need to develop bipolar separators with improved fluid distribution properties. The present invention addresses this issue and provides further related advantages.

BRIEF SUMMARY

Briefly, the present invention relates to a fuel cell separator comprising a first plate, the first plate comprising an active surface comprising a flow field and a header fluidly connected thereto, an opposing non-active surface, and a header channel fluidly connected to the header, wherein the header further comprises a recess directly fluidly connected to one end of the header channel, wherein the recess comprises a top perimeter and a side wall. In other embodiments, the invention relates to an electrochemical fuel cell stack comprising the fuel cell separator.

According to one embodiment of the present invention, the header channel is formed on the active surface of the first plate between a manifold opening and the recess. The manifold opening may be a supply manifold opening, wherein fluid is supplied from the manifold opening to a flow field on the active surface of the first plate through the header channel and the recess. Alternatively, the manifold opening may be an exhaust manifold opening, wherein fluid is exhausted from the flow field on the active surface of the first plate to the manifold opening through the recess and the header channel.

According to another embodiment of the present invention, the header channel is formed on the non-active surface of the first plate between the manifold opening and the recess. In this embodiment, the side wall of the header further comprises a fluid port fluidly connected to the end of the header channel. The manifold opening may be a supply manifold opening, wherein fluid is supplied from the manifold opening to a flow field on the active surface of the first plate through the header channel, the fluid port, and the recess. Alternatively, the manifold opening may be an exhaust manifold opening, wherein fluid is exhausted from the flow field on the active surface of the first plate to the manifold opening through the recess, the fluid port, and the header channel.

According to yet another embodiment of the present invention, the fuel cell separator further comprises a second plate, the second plate comprising a second active surface and an opposing second non-active surface adjoining the first non-active surface. In one embodiment, the second plate comprises a second flow field and a second header fluidly connected thereto on the second active surface, and a second header channel fluidly connected to the second header, wherein the second header further comprises a second recess directly fluidly connected to one end of the second header channel, wherein the second recess comprises a second top perimeter and a second side wall.

According to another embodiment of the present invention, an electrochemical fuel cell stack comprises: a plurality of electrode assemblies each comprising a first electrode, a second electrode, and an electrolyte interposed between the first and second electrodes; and a separator interposed between adjacent pairs of the plurality of electrode assemblies. The separator comprises a first plate, the first plate comprising a first active surface comprising a first reactant flow field and a first header fluidly connected thereto, an opposing first non-active surface, and a first header channel fluidly connected to the first header, wherein the first header further comprises a first recess directly fluidly connected to one end of the first header channel, wherein the first recess comprises a first top perimeter and a first side wall.

These and other aspects of the invention will be evident upon review of the following disclosure and attached figures.

BRIEF DESCRIPTION OF THE SEVERAL VIEWS OF THE DRAWINGS

In the figures, identical reference numbers identify similar elements or acts. The sizes and relative positions of elements in the figures are not necessarily drawn to scale. For example, the shapes of various elements and angles are not drawn to scale, and some of these elements are arbitrarily enlarged and positioned to improve figure legibility. Further, the particular shapes of the elements, as drawn, are not intended to convey any information regarding the actual shape of the particular elements, and have been solely selected for ease of recognition in the figures.

DETAILED DESCRIPTION

Unless the context requires otherwise, throughout the specification and claims which follow, the word "comprise" and variations thereof, such as "comprises" and "comprising" are to be construed in an open, inclusive sense, that is as "including but not limited to".

The present invention is generally related to bipolar separators for fuel cells, such as phosphoric acid fuel cells, solid oxide fuel cells, and, in particular, polymer electrolyte membrane fuel cells. Bipolar separators may also be employed in electrolyzers having an electrode assembly structure.

Figure 1:
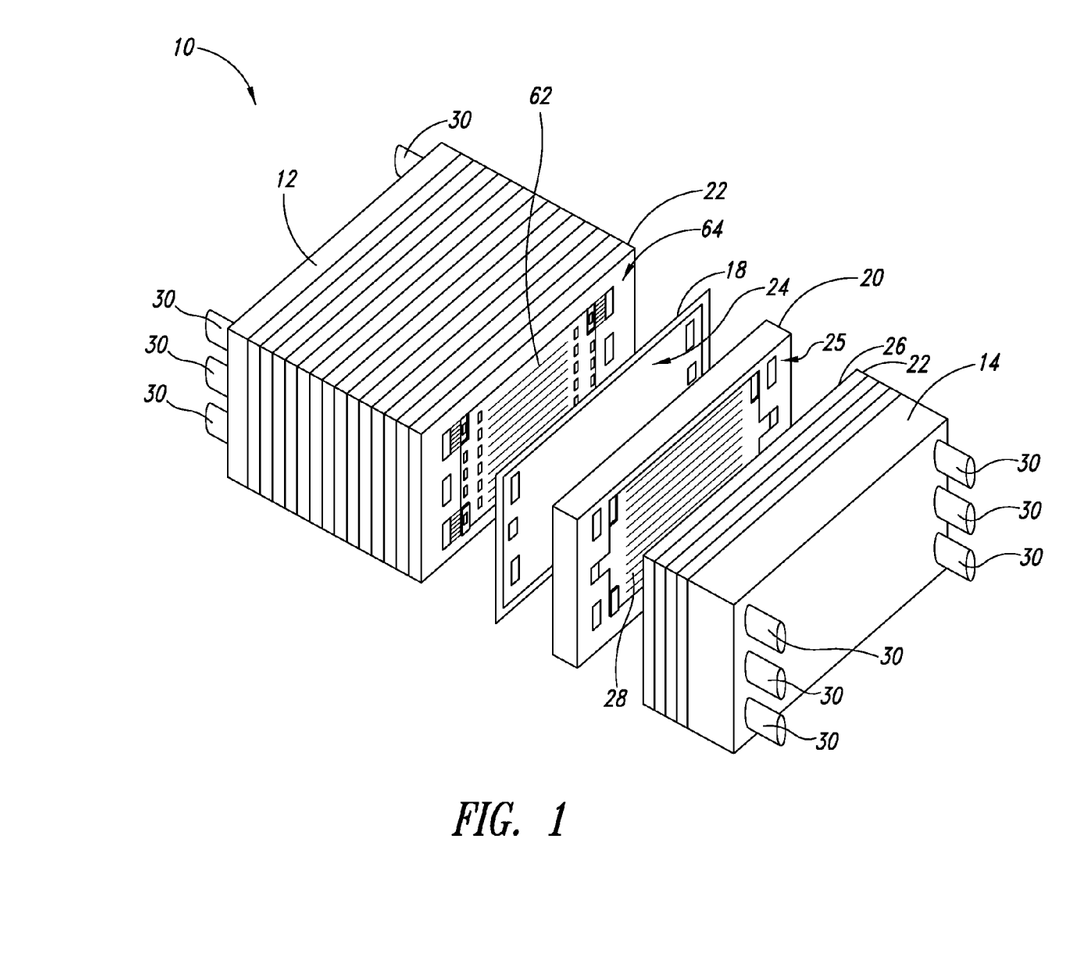
FIG. 1 shows an exploded view of an electrochemical fuel cell stack according to one embodiment of the present invention.

FIG. 1 is an exploded perspective view of a fuel cell stack incorporating the bipolar separator of the present invention. Fuel cell stack 10 includes a pair of end plate assemblies 12,14 and a plurality of stacked fuel cell assemblies 16, each comprising a membrane assembly 18 disposed between an anode plate 20 and a cathode plate 22. Anode 24 of electrode assembly 18 contacts the active surface of anode plate 20 and the cathode of electrode assembly 18 (not shown) contacts the active surface of cathode plate 22. Non-active surface 25 of anode plate 20 of a fuel cell assembly cooperates with non-active surface 26 of cathode plate 22 of an adjacent fuel cell to form a coolant flow field 28 therebetween. Fluid streams are supplied to and exhausted from stack 10 via inlet and outlet ports 30 in end plate assemblies 12,14. Aligned internal manifold openings are formed in the plates and the membrane assemblies to form internal manifolds extending through stack 10, discussed in further detail below.

Figure 2A:
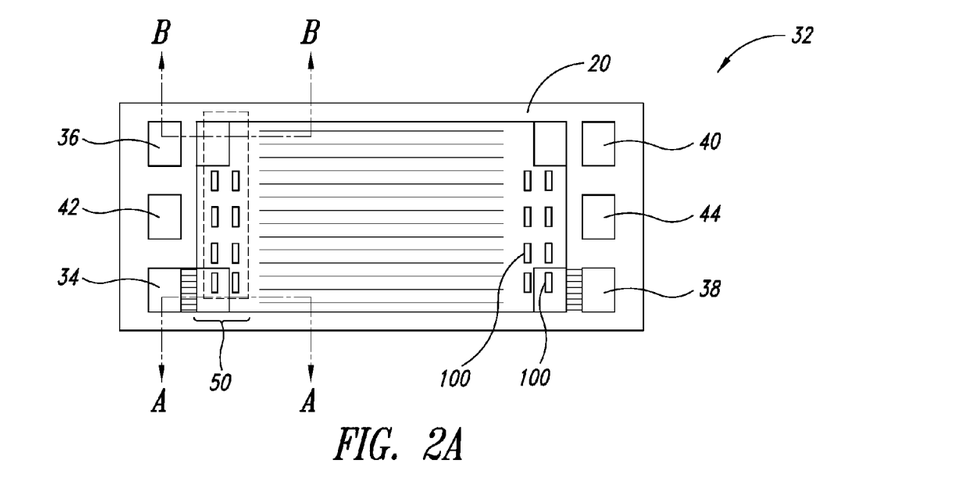
FIG. 2A shows a plan view of the bipolar separator from the anode side according to one embodiment of the present invention.
Figure 2B:
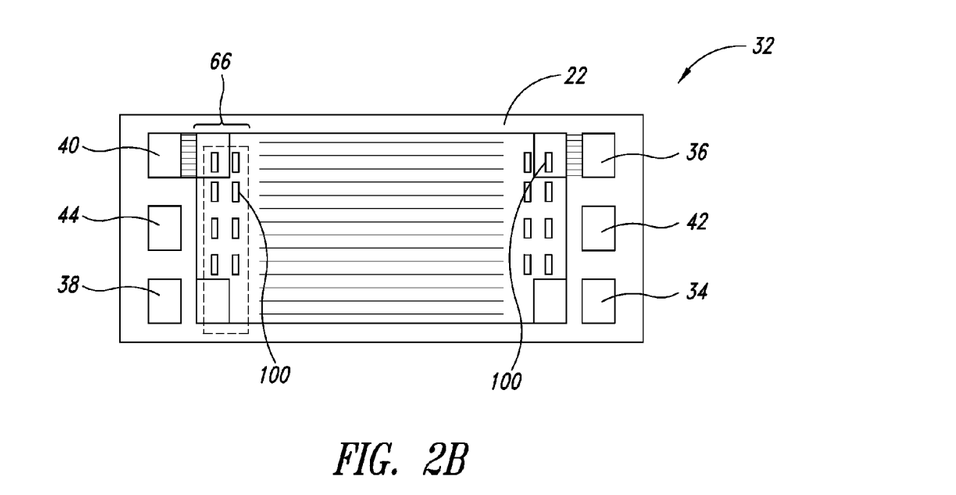
FIG. 2B shows a plan view from the cathode side of the bipolar separator of FIG. 1A.

FIG. 2A is a plan view of bipolar fuel cell separator 32 from the anode side, while FIG. 2B is a plan view of bipolar fuel cell separator 32 from the cathode side. Bipolar fuel cell separator 32 includes a fuel supply manifold opening 34 and oxidant supply manifold opening 36, with corresponding fuel exhaust manifold opening 38 and oxidant exhaust manifold opening 40, as well as coolant supply manifold opening 42 and coolant exhaust manifold opening 44.

Figure 3A:
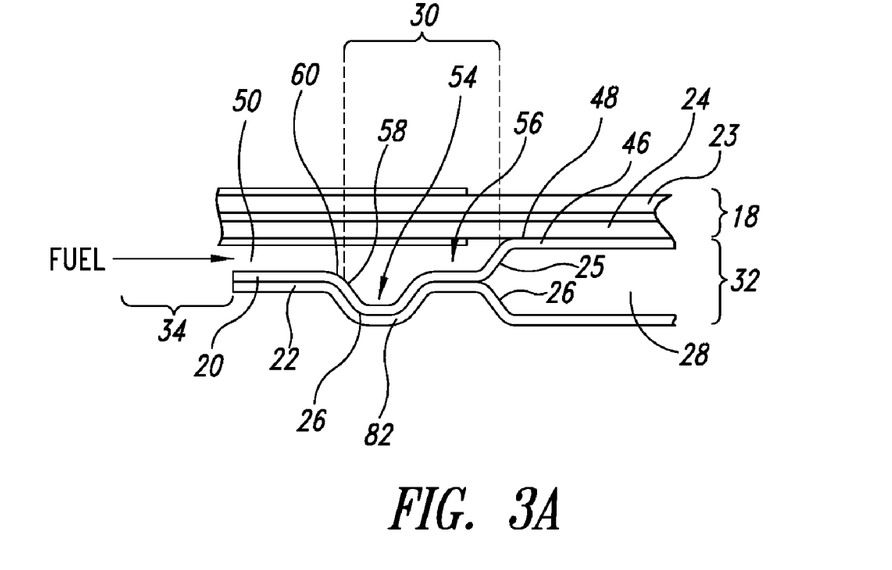
FIG. 3A shows a cross-sectional view of the bipolar separator at section A-A of FIG. 1A.
Figure 3B:
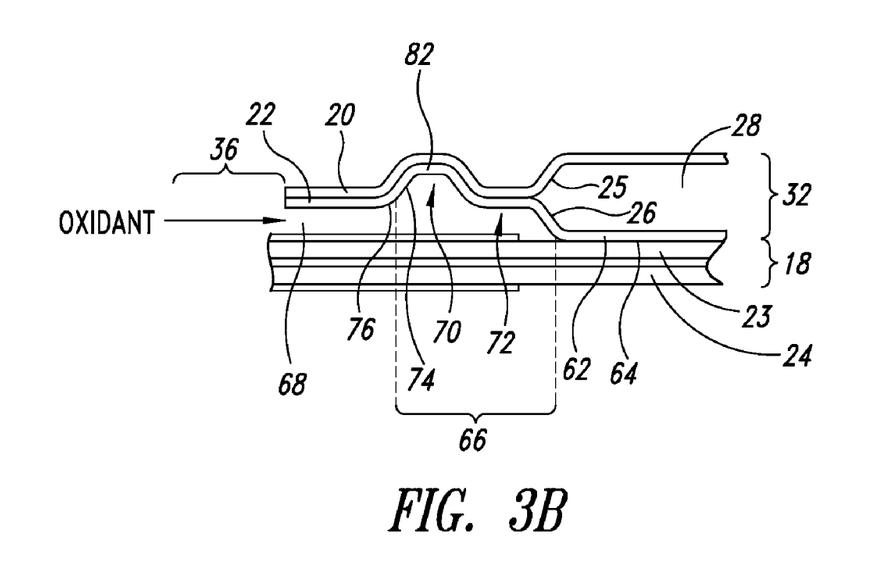
FIG. 3B shows a cross-sectional view of the bipolar separator at section B-B of FIG. 1A.

FIG. 3A is a cross-sectional view of bipolar fuel cell separator 32 along line A-A of FIG. 2A, and FIG. 3B is a cross-sectional view of bipolar fuel cell separator 32 along line B-B of FIG. 2A.

Referring to FIG. 3A, separator 32 includes an anode plate 20 and a cathode plate 22. Anode plate 20 comprises an anode flow field with anode flow channels 46 on active surface 48, a fuel supply manifold opening 34, and a fuel supply header 30 fluidly connecting manifold opening 34 with flow channels 46. Anode supply header channel 50 fluidly connects manifold opening 34 to header 30. Header 30 contains a recess 54 formed in plate 20. In the illustrated embodiment, recess 54 is formed between header channel 50 and remainder portion 56 of header 30, and fluidly connects them. In operation, a fluid, such as fuel (represented by the arrow), is supplied from manifold opening 34 to header channel 50 and flows into recess 54 prior to flowing into remainder portion 56 and then into flow channels 46. Side walls 58 of recess 54 extend from top perimeter 60 down into anode plate 20. Recess 54 may be deeper than remainder portion 56, for example, on the same plane as the bottom of flow channels 46 (not shown).

Referring to FIG. 3B, cathode plate 22 comprises a cathode flow field with cathode flow channels 62 on active surface 64, an oxidant supply manifold opening 36, and an oxidant supply header 66 fluidly connecting manifold opening 36 with flow channels 62. Cathode supply header channel 68 fluidly connects manifold opening 36 with header 66. Recess 70 of cathode plate 22 is formed between header channel 68 and remainder portion 72 of header 66, and fluidly connects them. In operation, a fluid, such as an oxidant (represented by the arrow), is supplied from manifold opening 36 to header channel 68 and flows into recess 70 prior to flowing into remainder portion 72 and then into flow channels 62. Side walls 74 of recess 70 extend from bottom perimeter 76 up into cathode plate 22. Recess 70 may be deeper than remainder portion 72, for example, on the same plane as the bottom of flow channels 62 (not shown).

Without being bound by theory, it is believed that recess 54,70 helps to eliminate pressure gradients within header 30,66, respectively, and to decrease the fluid velocity as it is supplied to remainder portion 56,72, respectively. Thus, the fluid flowing out of recess 54,70 will be more uniformly supplied from header 30,66, respectively, to flow channels 46,62, respectively, thereby creating a more uniform channel-to-channel flow distribution therein.

In both of FIGS. 3A and 3B, membrane assembly 18 is depicted for purpose of illustrating the flow of fuel and oxidant, respectively. In FIG. 2A, anode 24 of membrane assembly 18 is in contact with the anode flow field. In FIG. 2B, cathode 23 of membrane assembly 18 is in contact with the cathode flow field. It should be understood that a membrane assembly would be adjacent both the anode and cathode flow field of bipolar fuel cell separator 32, although only a single membrane assembly is illustrated in FIGS. 3A and 3B.

Figure 4A:
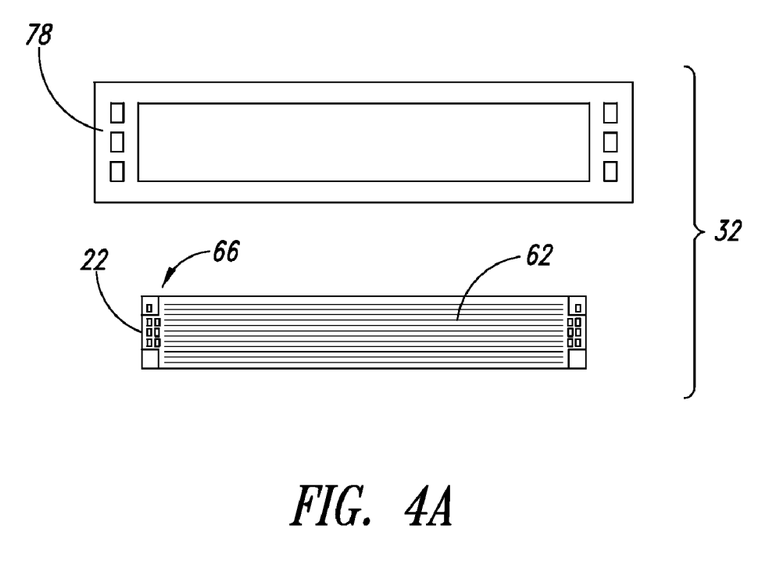
FIG. 4A shows a plan view of the bipolar separator from the anode side according to another embodiment of the present invention.
Figure 4B:
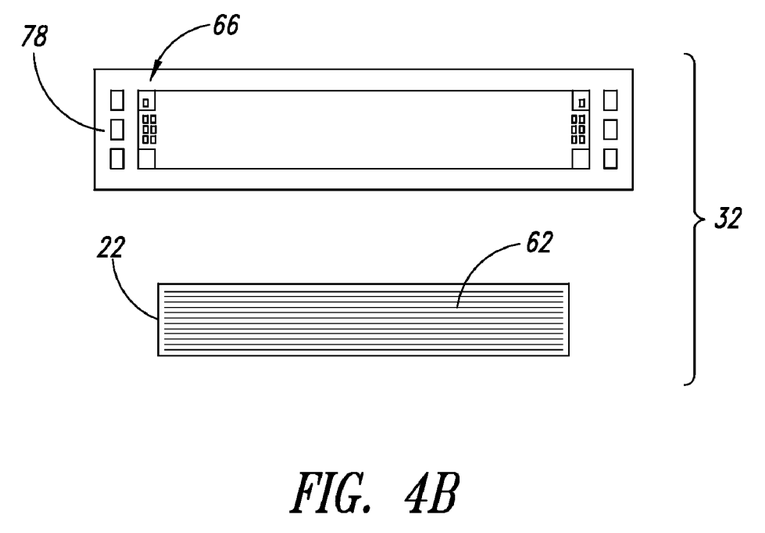
FIG. 4B shows a plan view from the cathode side of the bipolar separator of FIG. 3A.

As illustrated in FIGS. 2A and 2B, the manifold openings are formed in the plate. However, one of ordinary skill in this field will appreciate that external openings may be formed in frames attached to the edge of the separator. For example, in FIG. 4A, separator 32 comprises a frame 78 that contains manifold openings, which surrounds cathode flow channels 62 and header 66, and is externally attached to the peripheral edge of cathode flow field plate 22. In other embodiments, header 66 may be formed in frame 78, if desired, which surrounds cathode flow channels 62, such as shown in FIG. 4B. Other separator and frame arrangements may be employed, if desired, such as described in co-pending application titled "Bipolar Flow Field Plate Assembly and a Method of Making the Same", U.S. application Ser. No. 11/509,325, filed Aug. 23, 2006.

Figure 5A:
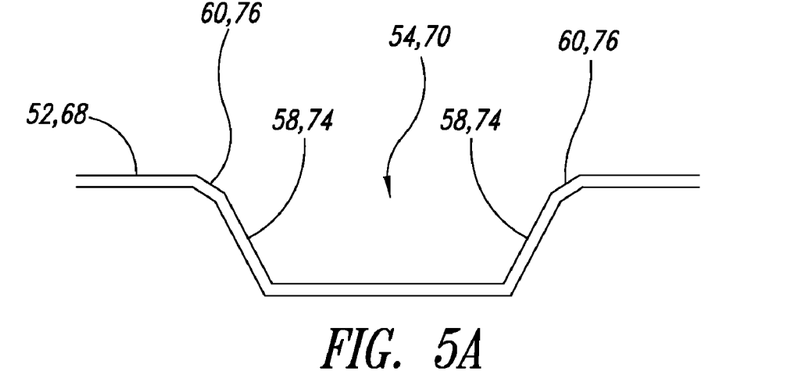
FIG. 5A shows a cross-sectional view of the recess in the bipolar separator according to another embodiment of the present invention.
Figure 5B:
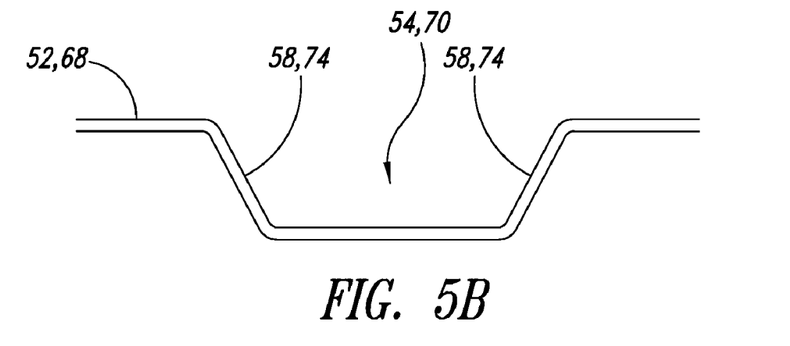
FIG. 5B shows a cross-sectional view of the recess in the bipolar separator according to another embodiment of the present invention.
Figure 5C:
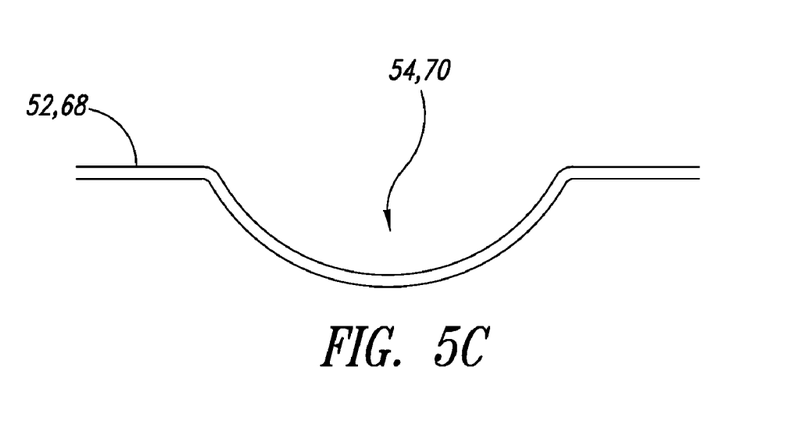
FIG. 5C shows a cross-sectional view of the recess in the bipolar separator according to another embodiment of the present invention.
Figure 5D:
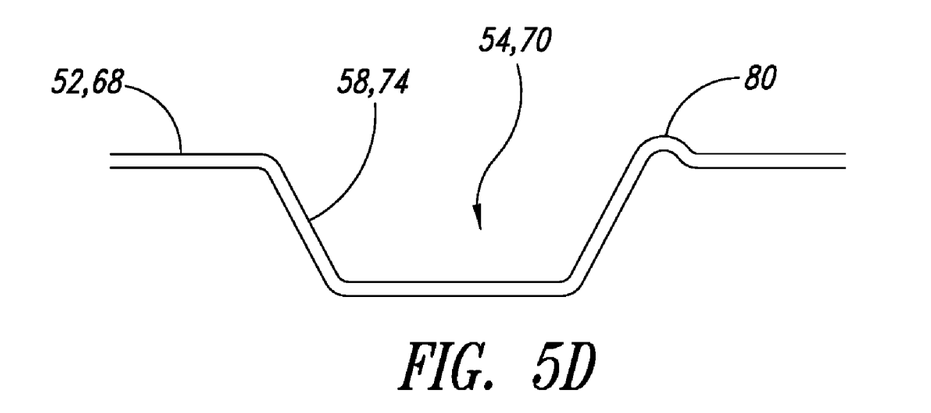
FIG. 5D shows a cross-sectional view of the recess in the bipolar separator according to another embodiment of the present invention.
Figure 5E:
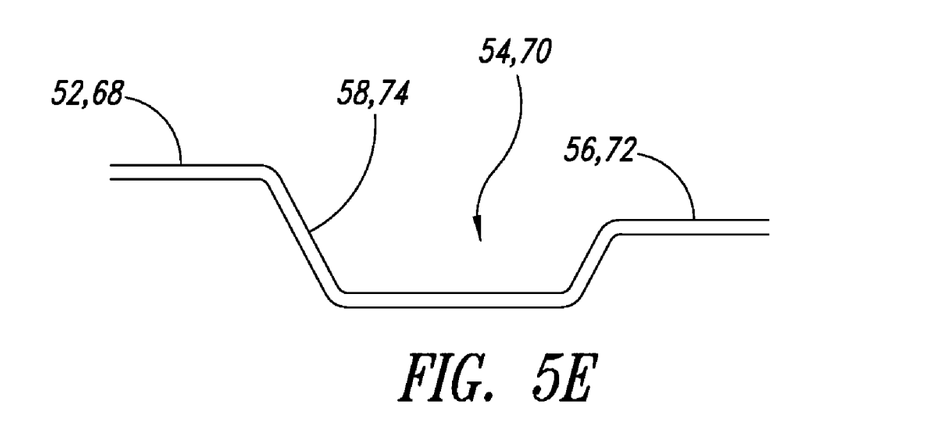
FIG. 5E shows a cross-sectional view of the recess in the bipolar separator according to another embodiment of the present invention.

Recesses 54,70 may be any planar shape or configuration, such as, but not limited to, square, rectangular, circular, and triangular. In certain embodiment, referring to FIG. 5A, the angle of side walls 58,74 (i.e., the slope of the side walls relative to active surfaces 48,64, respectively) may be between about 45° to about 90°, generally from about 60° to about 90°, and typically from 80° to 90°. In certain embodiments, sidewalls 58,74 may be chamfered at top perimeter 60,76, as shown in FIG. 5A. In other embodiments, side walls 58,74 may be curved to reduce flow resistance within the respective recess as the fluid enters the recess, such as that shown in FIGS. 5B and 5C. In yet other embodiments, top perimeter 60,76 may further comprise a lip 80 that protrudes from top perimeter 60,76, as shown in FIG. 5D, it being understood that the end of header channels 52,68 pass through lip 80 into recesses 54,70. In other embodiments, header channel 52,68 may be on a different plane than remainder portion 56,72, as shown in FIG. 5E.

Referring again to FIGS. 3A and 3B, plates 20,22 each comprise a ridge 82 on its active surface in the corresponding position to recess 54,70, respectively, on the active surface of the adjacent plate. For example, in FIG. 3A ridge 82 protrudes from cathode plate 22 to accommodate recess 54 of anode plate 20. Recess 54 contacts non-active surface 25 of cathode plate 22 at ridge 82 so that recess 54 may be made deeper than remainder portion 56 of anode plate 20, if desired.

Figure 6A:
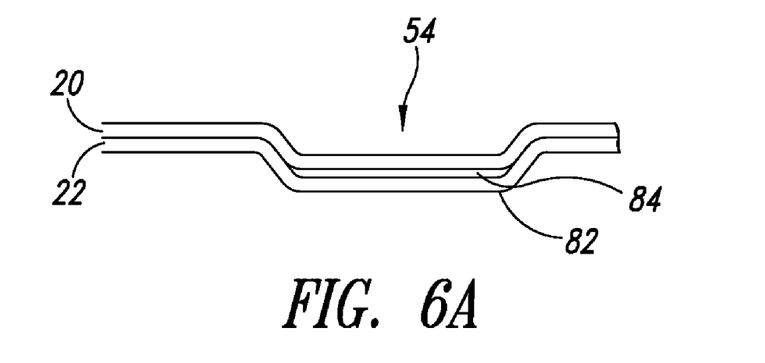
FIG. 6A shows a cross-sectional view of the recess in the bipolar separator according to another embodiment of the present invention.
Figure 6B:
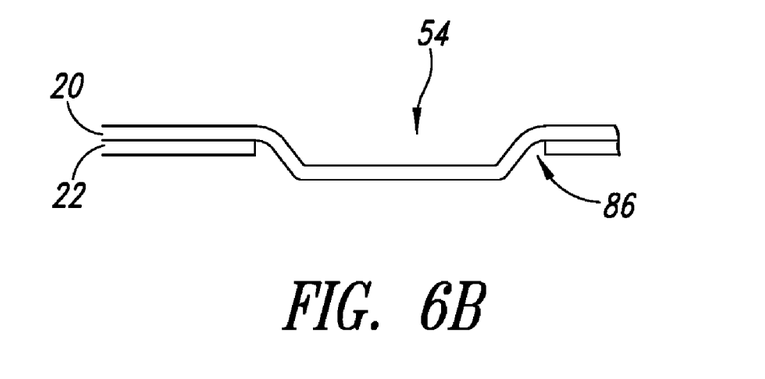
FIG. 6B shows a cross-sectional view of the recess in the bipolar separator according to another embodiment of the present invention.
Figure 6C:
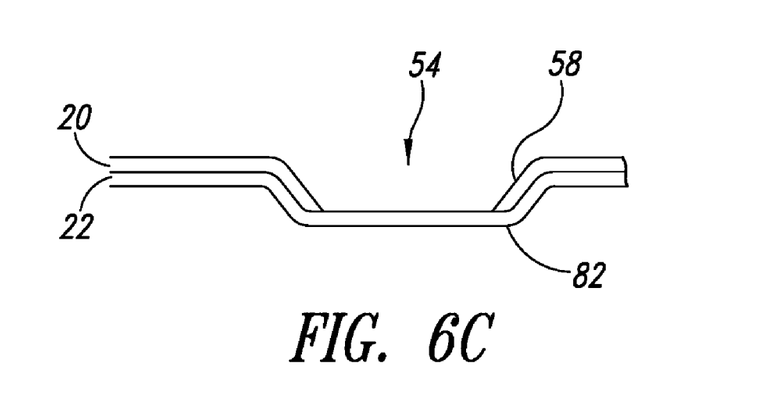
FIG. 6C shows a cross-sectional view of the recess in the bipolar separator according to another embodiment of the present invention.

In FIGS. 3A and 3B, recesses 54,70 contact ridge 82 of the respective adjacent plate. In alternative embodiments, recesses 54,70 do not contact ridge 82 of the respective adjacent plate, as shown by gap 84 in FIG. 6A. In other embodiments, openings in either plate are employed in forming the header recess. For example, in the embodiment illustrated in FIG. 6C, sidewalls 58 of the opening in plate 20 cooperate with adjacent surfaces of ridge 82 to form recess 54. Alternatively, recess 54 of plate 20 may protrude through a corresponding opening 86 in plate 22, as shown in FIG. 6B.

In the illustrated embodiments, and as illustrated in FIGS. 3A and 3B, non-active surface 25 of anode plate 20 and non-active surface 26 of cathode plate 22 cooperate to form a coolant flow field 28 therebetween. Coolant is provided between non-active surfaces 25,26 from coolant supply manifold opening 42, and exits coolant exhaust manifold opening 44, as shown in FIGS. 2A and 2B. In some embodiments, coolant flow channels may be formed in coolant flow field 28 on at least one of non-active surfaces 25,26 (not shown).

Anode and cathode plates 20,22 may be formed from a carbonaceous or graphitic material, such as impregnated expanded graphite, or from a metallic material, such as a coated steel, and may be bonded together to form bipolar flow field plate 32 by any means known in the art. For example, an adhesive may be placed into a seal groove that circumscribes the manifold openings and/or the coolant flow field on the non-active surface of the anode and/or cathode plate to adhesively join the plates, such as described in U.S. Pat. No. 6,777,127. As another example, metallic anode and cathode plates may be welded around the manifold openings and/or the coolant flow field on the non-active surface of the anode and/or cathode plate to bond the plates together.

In the embodiments discussed above, header channels 50,68 are formed on the active surface of the plate. Alternatively, header channels 50,68 may be formed on the non-active surface of the plate, as described herein below.

Figure 7A:
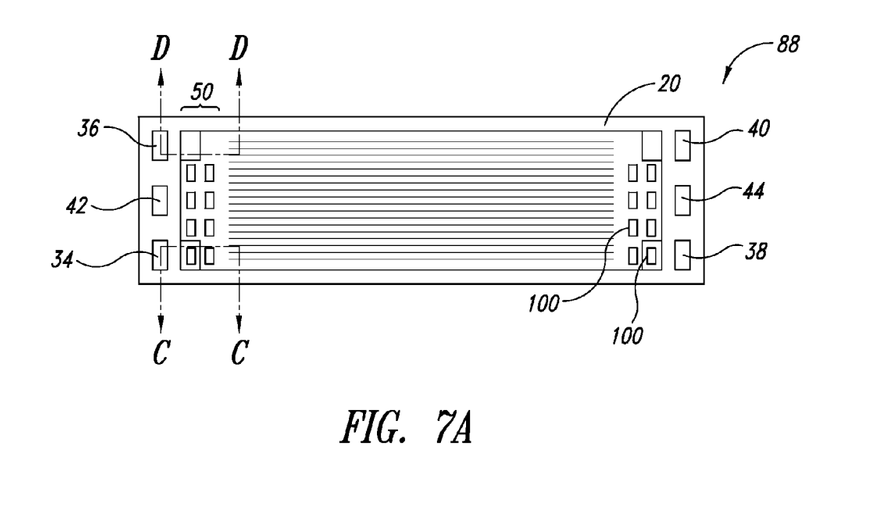
FIG. 7A shows a plan view of the bipolar separator from the anode side according to another embodiment of the present invention.
Figure 7B:
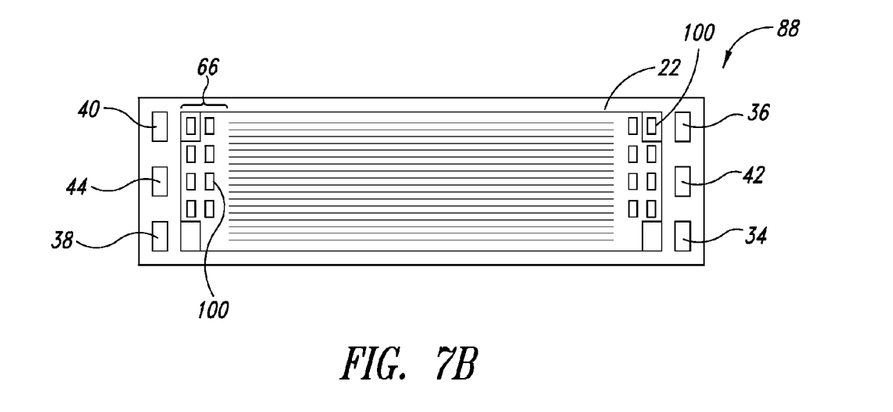
FIG. 7B shows a plan view of the bipolar separator from the cathode side according to another embodiment of the present invention.

FIG. 7A is a plan view of a bipolar fuel cell separator 88 from the anode side and FIG. 7B is a plan view of bipolar fuel cell separator 88 from the cathode side.

Figure 8A:
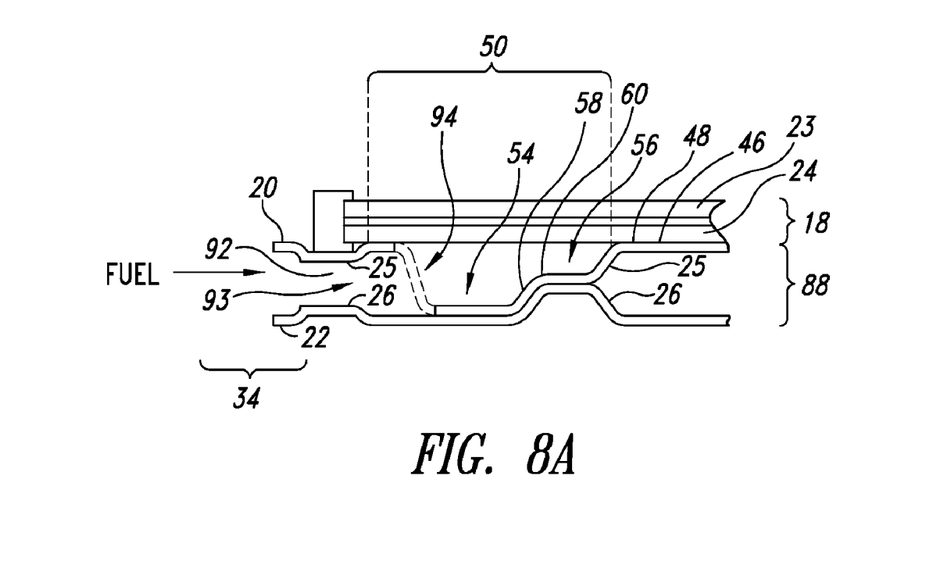
FIG. 8A shows a cross-sectional view of the bipolar separator at section C-C of FIG. 7A.
Figure 8B:
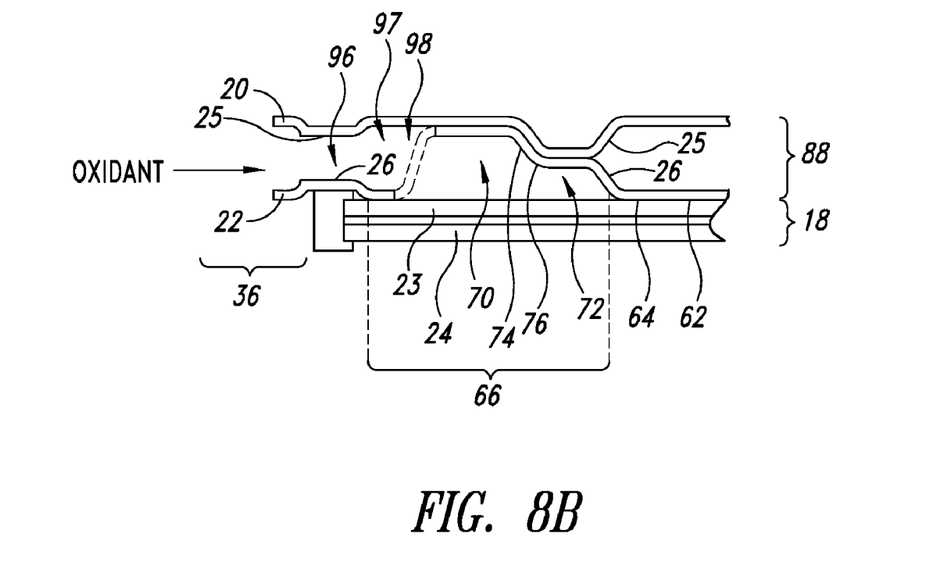
FIG. 8B shows a cross-sectional view of the bipolar separator at section D-D of FIG. 7A.

FIG. 8A is a cross-sectional view of bipolar fuel cell separator 88 along line C-C of FIG. 7A, and FIG. 8B is a cross-sectional view of bipolar fuel cell separator 88 along line D-D of FIG. 7A.

Referring to FIG. 8A, separator 88 includes an anode plate 20 and a cathode plate 22. Anode plate 20 comprises an anode flow field with anode flow channels 46 on active surface 48, a fuel supply manifold opening 34, and a fuel supply header 50 fluidly connecting manifold opening 34 with flow channels 46. Anode supply header channel 92 fluidly connects manifold opening 34 to header 50. Header 50 contains a recess 54 formed in plate 20 that is formed between header channel 92 and remainder portion 56, and fluidly connects them. In the illustrated embodiment, anode supply header channel 92 is formed between non-active surfaces 25,26 and extends from manifold opening 34 to recess 54 via fluid port 94. Fluid port 94 penetrates through the thickness of anode plate 20 into recess 54, thereby fluidly connecting manifold opening 34 to flow channels 46. In operation, a fluid, such as fuel (represented by the arrow), is supplied from manifold opening 20 to header channel 92 and flows into recess 54 prior to flowing into remainder portion 56 and then into flow channels 46. Side walls 58 of recess 54 extend from top perimeter 60 down into anode plate 20. Both recess 54 and region 93 help to create a more uniform channel-to-channel flow distribution in flow channels 46.

Referring to FIG. 8B, cathode plate 22 comprises a cathode flow field with cathode flow channels 62 on active surface 64, an oxidant supply manifold opening 36, and an oxidant supply header 66 fluidly connecting manifold opening 36 with flow channels 62. Cathode supply header channel 96 fluidly connects manifold opening 36 with header 66. Header 66 contains a recess 70 formed in plate 22 that is formed between header channel 96 and remainder portion 72, and fluidly connects them. In the illustrated embodiment, cathode supply header channel 96 is formed between non-active surfaces 25,26 and extends from manifold opening 36 to recess 70 via fluid port 98. Fluid port 98 penetrates through the thickness of cathode plate 22 into recess 70, thereby fluidly connecting manifold opening 36 to flow channels 62. In operation, a fluid, such as oxidant (represented by the arrow), is supplied from manifold opening 36 to header channel 96 and flows into recess 70 prior to flowing into remainder portion 72 and then into flow channels 62. Side walls 74 of recess 70 extend from bottom perimeter 76 down into cathode plate 22. Both recess 70 and region 97 help to create a more uniform channel-to-channel flow distribution in flow channels 62.

As mentioned earlier, in the illustrated embodiment, non-active surfaces 25,26 of anode and cathode plates 20,22, respectively, cooperate to provide header channels 92,96 for directing the fluid from a respective fuel or oxidant manifold opening to the respective flow channels. It should be understood that although header channels 92,96 each traverse the same non-active surfaces 25,26 of anode and cathode plates 20,22, header channels 92,96 are fluidly isolated from each other and from the coolant, for example, by the use of additional seals and/or adhesives. In other embodiments, only one of the anode and cathode plates comprises header channels 92,96 and fluid ports 94,98, respectively.

In both of FIGS. 8A and 8B, membrane assembly 18 is depicted for purpose of illustrating the flow of fuel and oxidant, respectively. In FIG. 7A, anode 24 of membrane assembly 18 is in contact with the anode flow field and in FIG. 7B, cathode 23 of membrane assembly 18 is in contact with the cathode flow field. It should be understood that a membrane assembly would be adjacent both the anode and cathode flow field of bipolar fuel cell separator 88, although only a single membrane assembly is illustrated in FIGS. 8A and 8B.

Figure 9:
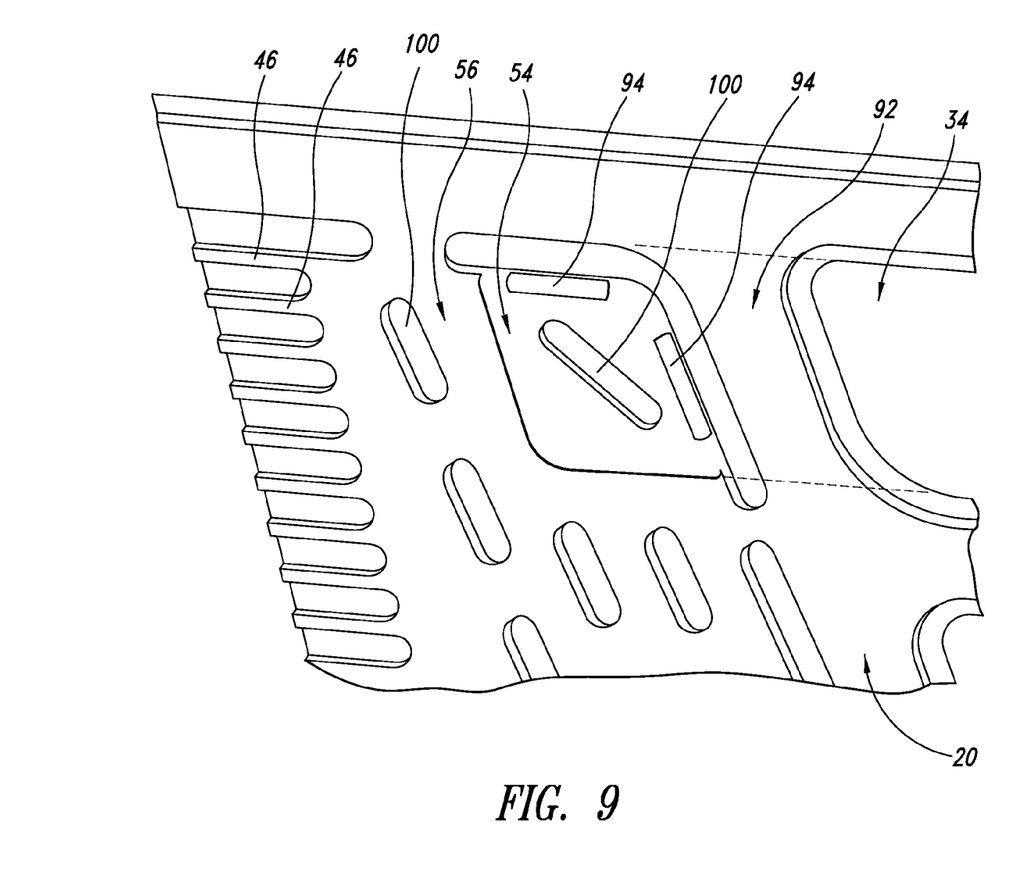
FIG. 9 shows a plan view of the bipolar separator from the anode side according to another embodiment of the present invention.

In another embodiment, a plurality of fluid ports 94,98 may be formed in the plates to fluidly connect the manifold openings to the respective active surfaces, such as anode plate 20 shown in FIG. 9. Two fluid ports 94 fluidly connect manifold opening 34 to flow channels 46 via anode header supply channel 92 formed on the non-active side of anode plate 20. For example, fluid, such as fuel, is supplied from manifold opening 34 to anode supply header channel 92 (formed on the non-active surface of anode plate 20 and defined by the dotted lines) to recess 54 via fluid ports 94, and then to remainder portion 56 and flow channels 46.

In any of the above embodiments, headers 50,66 further contain header protrusions 100, as shown in FIGS. 2, 4A, 4B, 7A, 7B, and 9. Header protrusions 100 may protrude from active surface 48,64 to support the contacting electrodes of the electrode assemblies in headers 30,66. One of ordinary skill in the art will appreciate that header protrusions 100 may be any configuration and is not limited to the configurations shown in the figures. However, the use of header protrusions 100 is optional.

In any of the above embodiments, anode plate 20 and cathode plate 22 may further comprise seal grooves for accommodating seals that fluidly isolate each of the manifolds and the flow channel area.

In the foregoing embodiments, the manifold openings, headers, and recesses are illustrated at the inlet or "supply" of the plates. However, one of ordinary skill in the art will appreciate that the recesses may also be formed at the headers at the outlet or "exhaust" of the plates. In such instances, the fluid from the flow channels flows from the remainder of the header to the recess before entering the header channel that fluidly connects to the exhaust manifold opening. Furthermore, anode and cathode plates are shown in the figures with recesses 54,70, respectively. In other embodiments, only one of the anode and the cathode plates comprises recesses 54,70, respectively.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

While particular elements, embodiments, and applications of the present invention have been shown and described, it will be understood that the invention is not limited thereto since modifications may be made by those skilled in the art without departing from the spirit and scope of the present disclosure, particularly in light of the foregoing teachings.

What is claimed is:

1. A fuel cell separator comprising a first plate, the first plate comprising:
   a first active surface comprising a first reactant flow field comprising a number of flow channels and a first header fluidly connected to the flow channels;
   an opposing first non-active surface; and
   a first header channel fluidly connected to the first header;
   wherein the first header further comprises a first recess directly fluidly connected to one end of the first header channel, wherein the first recess comprises a first top perimeter and a first side wall, and wherein said recess is dimensioned to reduce pressure gradients within the first header, to decrease fluid velocity, to provide a more uniform supply of fluid to the flow channels, thereby creating a more uniform channel-to-channel flow distribution than in the absence of the recess.

2. The fuel cell separator of claim 1 wherein the first side wall has a draft angle of less than about 90 degrees with respect to the first active surface.

3. The fuel cell separator of claim 1 further comprising at least one protrusion extending from the first active surface.

4. The fuel cell separator of claim 1 wherein the first plate is comprised of a material selected from the group consisting of a metallic, carbonaceous, graphitic, and polymeric materials.

5. The fuel cell separator of claim 1 wherein the first header is formed on the first active surface.

6. The fuel cell separator of claim 1 wherein the first header channel is formed in the first non-active surface, and the first side wall of the first header further comprises at least one fluid port fluidly connected to the end of the first header channel.

7. The fuel cell separator of claim 6 wherein at least a portion of the first side wall is curved.

8. The fuel cell separator of claim 1 wherein the first plate further comprises a manifold opening fluidly connected to the other end of the first header channel that cooperate to form an internal manifold.

9. The fuel cell separator of claim 1 further comprising a second plate comprising a second active surface and an opposing second non-active surface adjoining the first non-active surface.

10. The fuel cell separator of claim 9 wherein the first and second non-active surfaces are bonded together.

11. The fuel cell separator of claim 9 wherein the first and second non-active surfaces cooperate to form a coolant flow field therebetween.

12. The fuel cell separator of claim 9 wherein the first plate is an anode plate and the second plate is a cathode plate.

13. The fuel cell separator of claim 9 wherein the first header is a supply header.

14. The fuel cell separator of claim 9 wherein the first header is an exhaust header.

15. The fuel cell separator of claim 9 wherein the second plate further comprises: a second flow field comprising a number of flow channels and a second header fluidly connected to the flow channels on the second active surface; and
  a second header channel fluidly connected to the second header,
  wherein the second header further comprises a second recess directly fluidly connected to one end of the second header channel, wherein the second recess comprises a second top perimeter and a second side wall, and wherein said second recess is dimensioned to reduce pressure gradients within the second header, to decrease fluid velocity, to provide a more uniform supply of fluid to the flow channels, thereby creating a more uniform channel-to-channel flow distribution than in the absence of the recess.

16. An electrochemical fuel cell stack comprising:
  a plurality of electrode assemblies each comprising a first electrode, a second electrode, and an electrolyte interposed between the first and second electrodes;
  a separator interposed between adjacent pairs of the plurality of electrode assemblies, the separator comprising a first plate, the first plate comprising:
    a first active surface comprising a first reactant flow field comprising a number of flow channels and a first header fluidly connected to the flow channels;
    an opposing first non-active surface; and
    a first header channel fluidly connected to the first header;
    wherein the first header further comprises a first recess directly fluidly connected to one end of the first header channel, wherein the first recess comprises a first top perimeter and a first side wall, and wherein said recess is dimensioned to reduce pressure gradients within the first header, to decrease fluid velocity, to provide a more uniform supply of fluid to the flow channels, thereby creating a more uniform channel-to-channel flow distribution than in the absence of the recess.

17. The electrochemical fuel cell stack of claim 16 wherein the first header is formed on the first active surface.

18. The electrochemical fuel cell stack of claim 16 wherein the first header channel is formed in the first non-active surface, and the first side wall of the first header further comprises at least one fluid port fluidly connected to the end of the first header channel.

19. The electrochemical fuel cell stack of claim 16 further comprising a second plate comprising a second active surface and an opposing second non-active surface adjoining the first non-active surface.

20. The electrochemical fuel cell stack of claim 19 wherein the second plate further comprises:
  a second flow field and a second header fluidly connected thereto on the second active surface; and
  a second header channel fluidly connected to the second header;
  wherein the second header further comprises a second recess directly fluidly connected to one end of the second header channel, wherein the second recess comprises a second top perimeter and a second side wall.

* * * * *